United States Patent [19]
Onisawa et al.

[11] Patent Number: 5,552,909
[45] Date of Patent: Sep. 3, 1996

[54] ACTIVE MATRIX LIQUID-CRYSTAL DISPLAY DEVICE HAVING ITO SIGNAL LINES AND EITHER A SYMMETRIC TFT STRUCTURE OR ELECTRODE AND SIGNAL LINE EDGES WITH TAPER ANGLES ≦30°

[75] Inventors: Kenichi Onisawa, Katsuta; Takashi Suzuki; Masahiko Ando, both of Hitachi; Masuyuki Ota, Katsuta; Toshiki Kaneko, Mito; Tetsuro Minemura, Hitachiota, all of Japan

[73] Assignee: Hitachi, Ltd., Tokyo, Japan

[21] Appl. No.: 301,202

[22] Filed: Sep. 6, 1994

[30] Foreign Application Priority Data

Sep. 7, 1993 [JP] Japan ................................. 5-221873

[51] Int. Cl.⁶ ........................... G02F 1/136; G02F 1/1345
[52] U.S. Cl. ................................................ 359/59; 359/87
[58] Field of Search ................................. 359/59, 54, 87

[56] References Cited

U.S. PATENT DOCUMENTS

| | | | |
|---|---|---|---|
| 4,563,806 | 1/1986 | Coissard et al. | 29/571 |
| 5,002,367 | 3/1991 | Nicholas | 359/54 |
| 5,200,846 | 4/1993 | Hiroki et al. | 359/59 |
| 5,245,452 | 9/1993 | Nakamura et al. | 359/59 |
| 5,262,800 | 11/1993 | Smith et al. | 347/262 |
| 5,293,261 | 3/1994 | Shashidhar et al. | 359/103 |
| 5,413,968 | 5/1995 | Inoue et al. | 437/200 |
| 5,434,433 | 7/1995 | Takasu et al. | 359/59 |

FOREIGN PATENT DOCUMENTS

| | | | |
|---|---|---|---|
| 0221361 | 5/1987 | European Pat. Off. | 359/59 |
| 4-26084 | 5/1992 | Japan . | |

OTHER PUBLICATIONS

Le Contellec, et al., "Two–Mask a–Si:H TFT Matrix For Active Liquid Crystal Displays", Optoelectronics–Device and Technologies, 7:2, pp. 287–299, Dec., 1992.

*Primary Examiner*—Anita Pellman Gross
*Assistant Examiner*—Walter J. Malinowski
*Attorney, Agent, or Firm*—Pennie & Edmonds

[57] ABSTRACT

An active matrix type liquid-crystal display device wherein a plurality of gate wiring lines and drain wiring lines which cross perpendicularly to each other are laid on a first of two insulating substrates. The gate wiring lines and the drain wiring lines are electrically insulated from each other at areas where they crossover each other and thin-film transistors are respectively arranged near the individual crossover areas with their respective source electrodes connected to corresponding ones of transparent pixel electrodes disposed near the source electrodes, with their respective drain electrodes connected to the drain wiring lines, and with their respective gate electrodes connected to the gate wiring lines. The above structure, which includes the first insulating substrate, is covered with either only alignment layers or both protective insulating layers and alignment layers. Sets of transparent electrodes and alignment layers, each of the sets being opposite to a corresponding one of the transparent pixel electrodes, are disposed on a second of the two insulating substrates, the second insulating substrate being transparent and being located in opposition to the first insulating substrate. A liquid crystal is held between the two insulating substrates. The gate wiring lines as well as the drain wiring lines, and the transparent electrodes which are opposite to the wiring lines on the transparent insulating substrate are connected to liquid-crystal driver circuits which are provided outside the liquid-crystal display device. The improvement to the liquid crystal display device comprises the fact that the drain wiring lines, and the drain electrodes and the source electrodes of the thin-film transistors are formed of the same material as that of the transparent pixel electrodes, and that the transparent pixel electrodes are made thinner than the drain wiring parts.

8 Claims, 3 Drawing Sheets

ACTIVE MATRIX LIQUID-CRYSTAL DISPLAY DEVICE HAVING ITO SIGNAL LINES AND EITHER A SYMMETRIC TFT STRUCTURE OR ELECTRODE AND SIGNAL LINE EDGES WITH TAPER ANGLES ≦30°

BACKGROUND OF THE INVENTION

1. Field of the Invention

The present invention relates to an active matrix type liquid-crystal display (LCD) device which is driven by thin-film transistors (TFT's). More particularly, it relates to a TFT-LCD device of lower cost and higher performance.

2. Description of the Related Art

Demand has increased for active matrix type LCD devices of high cost performance and TFT drive mode. In order to comply with the demand, it is necessary to realize curtailment in the cost of a manufacturing process for the TFT-LCD device applying amorphous silicon (a-Si), that is, a reduction in the number of process steps, enhancement in the throughput of the manufacturing process and enhancement in the yield of the TFT-LCD device, and also to heighten the performance of the TFT-LCD device including capabilities for a large size, a high resolution and gray-scale representation. For such purposes, Japanese Patent Application Publication (KOKOKU) No. 26084/1992 has proposed an active matrix type display device comprising a plurality of column selection lines which are formed of a first conductor layer made of a transparent electrode film deposited on an insulating substrate, drain electrodes which are respectively integral with the corresponding column selection lines, display pixel electrodes which are arrayed at individual pixel positions, source electrodes which are respectively integral with the corresponding display pixel electrodes, a semiconductor layer which is formed on the insulating substrate so as to extend onto the drain and source electrodes, a plurality of row selection lines which are formed of a second conductor layer deposited on the semiconductor layer through a gate insulating layer, and gate electrodes which are respectively integral with the corresponding row selection lines, wherein the semiconductor layer and the gate insulating layer are patterned in the same shapes as those of the row selection lines and the gate electrodes integral therewith. With this structure, it is intended to simplify the manufacturing process and to enhance the reliability and yield of the TFT-LCD device owing to the prevention of the breaking of the electrode wiring lines.

The device structure based on the prior-art technique is very effective for simplifying the manufacturing process. It has been impossible, however, to say that contrivances for the higher performance, including the capabilities for the large size, high resolution and gray-scale representation, have proved satisfactory. Moreover, the curtailment in the cost has been difficult due to low yield.

SUMMARY OF THE INVENTION

An object of the present invention is to provide an active matrix type liquid-crystal display device of TFT drive mode which can be manufactured by a simple process, which can be produced at a high yield, and which is intended to have improved performance including capabilities for a large size, a high resolution and gray-scale representation.

In one aspect of performance of the present invention for accomplishing the object, there is provided an active matrix type liquid-crystal display device wherein a plurality of gate wiring lines and drain wiring lines which cross perpendicularly to each other are laid on a first of two insulating substrates. The gate wiring lines and the drain wiring lines are electrically insulated from each other at points where they cross (crossover areas), and; thin-film transistors are respectively arranged near the individual crossover areas with their respective source electrodes connected to corresponding ones of transparent pixel electrodes disposed near the source electrodes, with their respective drain electrodes connected to the drain wiring lines, and with their respective gate electrodes connected to the gate wiring lines. The above structure, which includes the first insulating substrate, is covered with either only alignment layers or both protective insulating layers and alignment layers. Sets of transparent electrodes and alignment layers, each of the sets being opposite to a corresponding one of the transparent pixel electrodes, are disposed on a second of the two insulating substrates, the second insulating substrate being transparent and being located in opposition to the first insulating substrate. A liquid crystal is held between the two insulating substrates. The gate wiring lines as well as the drain wiring lines and the transparent electrodes which are opposite to the wiring lines on the transparent insulating substrate, are connected to liquid-crystal driver circuits which are provided outside the liquid-crystal display device. The active matrix type liquid crystal display device of the first aspect features, the fact that the drain wiring lines, and the drain electrodes and the source electrodes of the thin-film transistors, are formed of the same material as that of the transparent pixel electrodes, and that the transparent pixel electrodes are made thinner than the drain wiring parts.

The active matrix type liquid-crystal display device can be so constructed that the drain wiring lines, the drain electrodes and the source electrodes of the thin-film transistors, and the transparent pixel electrodes are respectively formed with tapered edges. As another aspect of the construction, a taper angle of each of the tapered edges is within 30°.

In addition, the active matrix type liquid-crystal display device can be so constructed that each of the thin-film transistors includes a semiconductor layer, a gate insulating layer and the gate electrode which are formed extending on the drain electrode and the source electrode, and that a pattern of a stacked area of the semiconductor layer and the gate insulating layer and a pattern of the gate electrode lie on an identical center line in a state in which right and left pattern parts, with respect to the center line, are symmetrical.

Preferably, a width of the pattern of the gate electrode is smaller than that of the pattern of the stacked area of the semiconductor layer and the gate insulating layer, and a difference between both the widths is between 0.2 and 5 [μm].

Also preferably, the protective insulating layers for covering the first insulating substrate are respectively formed on the corresponding transparent pixel electrodes with through-holes, each of which has an area not larger than that of the transparent pixel electrode, and a plane pattern of the through-hole is substantially in agreement with that of steps, each of which is formed by the drain wiring line, the drain electrode and the source electrode constituting the thin-film transistor, and the transparent pixel electrode.

Besides, steps are respectively formed by the drain wiring line, the drain electrode and the source electrode constituting the thin-film transistor, and the transparent pixel electrode, and a plane pattern of the steps is substantially in agreement with that of the stacked area of the semiconductor layer and the gate insulating layer of the thin-film transistor.

Transparent conductor layers which forms the drain wiring lines, and the gate wiring lines may respectively have a sheet resistance of, at most, 5 [Ω/□].

The transparent pixel electrodes may exhibit a transmittance of, at least, 85 [%] for a radiation which has a wavelength of 550 [nm].

It is also possible for the gate electrodes to be made of a metal material whose main component is an element selected from the group consisting of aluminum (Al) and tantalum (Ta), and for a surface and edges of each of the gate electrodes to be covered with an anodic oxidation film of the electrode material.

Owing to the features described above, the active matrix type liquid-crystal display device according to the present invention can be manufactured by a simple process, it can lower the resistance of the drain wiring, and it can suppress the leakage between the gate electrodes and the drain electrodes.

DETAILED DESCRIPTION OF THE INVENTION

Principles of the Invention:

The principles of the present invention will now be elucidated.

According to the prior art, in order to simplify the structure of an active matrix type liquid-crystal display (LCD) device, the material ITO (Indium Tin Oxide) of the source electrodes and pixel electrodes of thin-film transistors (TFT's) has been employed as the material of the drain wiring (drain electrode) layer of the TFT's. Besides, the thickness of the drain wiring layer has usually been set at approximately 100 to 200 [nm] in order to ensure a certain transmittance and in consideration of step-coverage characteristics at the edges of the source and drain electrodes of the TFT's.

The sheet resistance of the ITO layer in this case, however, has become 10 to 20 [Ω/□] or above and has incurred the delay of the rise time of a drain voltage pulse, so that the charging rate of each TFT has been lowered. Accordingly enlarging the size of the LCD panel and increasing the resolution thereof has also been limited. Practical estimation has revealed that, in the VGA (Video Graphics Array) class (640×480 dots, 64 tones), a sheet resistance of 20 [Ω/□] affords the maximum diagonal size of 7 to 8 [inches], while a sheet resistance of 10 [Ω/□] affords the maximum diagonal size of 10 [inches].

A study based on a simulation has revealed that the sheet resistance of the drain wiring of the TFT's needs to be rendered 5 [Ω/□] or less in order to solve the problem of the rise time delay of the drain pulse and to permit a larger size, a higher resolution and gray-scale representation.

The specified sheet resistance can afford, at least, a diagonal size of 11 [inches] in the XGA (Extended Graphics Array) class (1024×768 dots, 64 tones).

In the case of employing metal wiring as the drain wiring, no problem has been involved in the realization of the sheet resistance of, at most, 5 [Ψ/□]. The material ITO, however, requires a layer thickness of 400 [nm] or more in order to attain the specified sheet resistance, so that the transmittance of the pixel electrodes lowers to 80 [%] or less (for a radiation of 550 [nm]). The present invention has solved this problem by making a pixel electrode part thinner than a drain wiring part.

Figure 5:
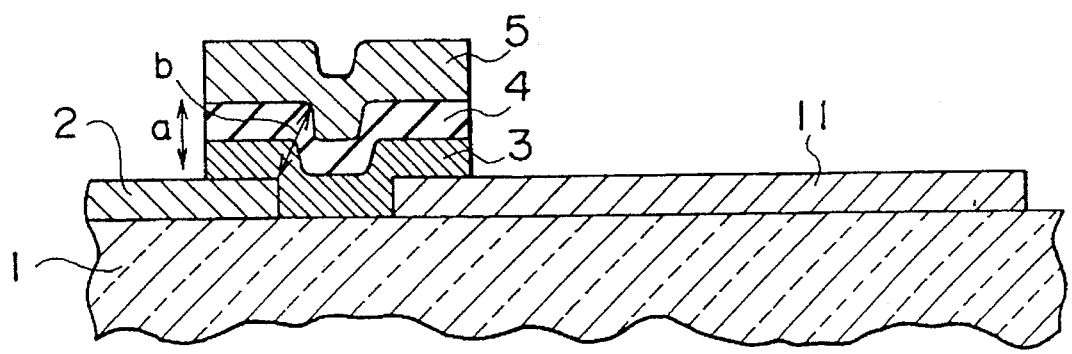
FIG. 5 is a schematic sectional view showing a TFT element in the prior art.

Upon studying the prior-art device structure in detail, the inventors have discovered that the most important factor contributing to lowering of the yield of the LCD device is the short circuit or leakage between the gate electrode and drain electrode of the TFT. This; factor will be explained in conjunction with a schematic vertical sectional view of a prior-art device shown in FIG. 5.

A source or drain electrode 2 and a pixel electrode 11 which are made of transparent ITO are formed on a glass substrate 1. A semiconductor layer 3 of a-Si:H (hydrogenated amorphous silicon), a gate insulating layer 4 and a gate electrode 5 are formed on the glass substrate 11 so as to extend on or over the electrodes 2 and 11.

Short circuit or leakage is caused by a path (a in the figure) extending along the edges of the a-Si:H semiconductor layer 3 and gate insulating layer 4 which are stacked on the source or drain electrode 2 made of the transparent ITO. It is also caused by a path (b in the figure) extending along the thin parts of the semiconductor layer 3 and gate insulating layer 4 which are stacked on the step of the edge of the source or drain electrode 2.

Regarding the cause of the path a, it is effective to keep the gate electrode 5 receding relative to the pattern of the semiconductor layer 3 as well as the gate insulating layer 4 (in other words, to over-etch the gate electrode 5 relative to the layers 3 and 4). In order to realize the receding gate electrode 5, the pattern of the gate electrode 5 may be rendered narrower than that of the semiconductor layer 3 as well as the gate insulating layer 4.

However, a method in which the narrow gate electrode pattern is formed by photolithography and etching increases the number of process steps, and it is counterproductive to the intention of simplifying a manufacturing process for the LCD device. It has therefore been considered to employ a method in which the gate electrode 5 is over-etched (it is etched so as to recede) when patterning the stacked area of the semiconductor layer 3, gate insulator 4 and gate electrode 5. In this regard, the inventors studied the receding width of the gate electrode 5 (the amount to which the gate electrode 5 receded) relative to the layers 3 and 4. As a result, it has been revealed only a slight recession of the gate electrode 5 is unsatisfactory, and that the receding width needs to be 0.2 [μm] or more. In addition, when the receding width is set greater than 5 [μm], the gate electrode 5 becomes excessively narrow, and the formation thereof is technically difficult.

Besides, the problem of the path a can be solved more reliably in such a way that a metal material whose main component is Al (aluminum) or Ta (tantalum) is employed as the material of the gate electrode 5, and that the front surface and edges of the layer of the gate electrode 5 are covered with an $Al_2O_3$ (aluminum oxide) or $Ta_2O_5$ (tantalum pentaoxide) film formed by anodic oxidation.

On the other hand, the problem of the path b arises conspicuously in the case where an ITO layer which is as thick as 400 [nm] or more is used as the source or drain electrode 2. As a solution to this problem, forming the edge of the source or drain electrode 2 into a taper shape has been found to be effective. Thus, the coverage characteristics of the semiconductor layer 3 and gate insulating layer 4 which are stacked on the step of the edge of the source or drain electrode 2 are enhanced to improve the qualities of the corresponding parts of the layers 3 and 4. It has also been revealed that the taper shape of the edge of the source or drain electrode 2 should preferably have a taper angle within 30°.

Owing to the expedients described above, the short circuit or leakage between the gate electrode 5 and the source or drain electrode 2 can be suppressed without appreciably increasing the number of process steps, with the result that the yield of the TFT-LCD device can be raised.

With the intention of simplifying the manufacturing process of the TFT-LCD device, an expedient to be described below is adopted in the present invention. Protective insulating layers for covering an insulating substrate are respectively formed on corresponding transparent pixel electrodes with through-holes, each of which has an area smaller than that of the transparent pixel electrode, and the plane pattern of the through-hole is substantially in agreement with that of steps which are respectively formed by a drain wiring line, a drain electrode and a source electrode constituting a thin-film transistor, and the transparent pixel electrode.

Thus, a photolithographic step which is based on a dedicated mask pattern for thinning the pixel electrode parts relative to the drain wiring of transparent electrodes (made of ITO) and the source and drain electrode parts is dispensed with, thereby permitting the material ITO to be processed by a photolithographic step which employs the same mask pattern as for forming the through-holes in the protective insulating layers. Preferred Embodiments of the Invention:

Now, the present invention will be concretely described in connection with examples.

Example 1

Figure 1:
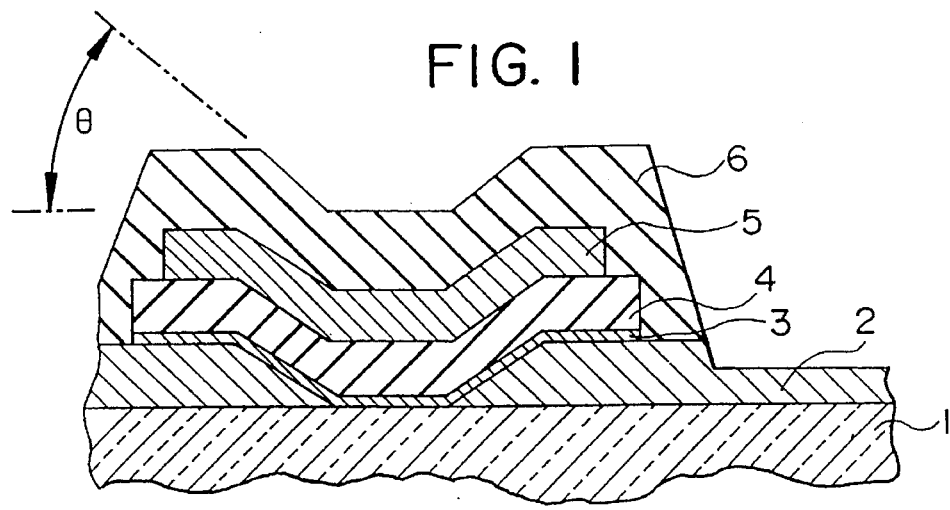
FIG. 1 is a schematic sectional view showing a TFT (thin-film transistor) element which is included in an active matrix type liquid-crystal display device according to Example 1 of the present invention.

A schematic vertical sectional view of a manufactured TFT element is illustrated in FIG. 1. A method of manufacturing the TFT element according to the present invention will be described with reference to the figure.

On a glass substrate 1, which has been carefully washed, an ITO layer 2 having a thickness of 400 [nm] was formed at a substrate temperature of 300 [°C.] by magnetron sputtering. The sheet resistance of the ITO layer 2 was verified to be 5 [Ω/□].

The ITO layer 2 was processed into source and drain wiring lines and pixel electrodes by photolithography and etching. A photoresist employed was of the positive type, and an etchant employed was an aqueous solution which was prepared by adding a suitable amount of HCl (hydrogen chloride) to FeCl$_3$ (iron chloride). The etching was carried out at 50 to 60 [°C.]. The taper angle of each of the tapered edges of the ITO layer obtained was 10°.

Subsequently, the resulting substrate structure was set in an RF (radio-frequency) plasma CVD (chemical vapor deposition) equipment. After the substrate structure was subjected to a PH$_3$ (hydrogen phosphide) plasma treatment in order to establish contacts with the ITO electrodes, an a-Si:H layer was formed as a semiconductor layer 3. The a-Si:H layer obtained was 18 [nm] thick under the conditions that a substrate temperature of 250 [°C.] was held, and that a gaseous mixture consisting of SiH$_4$ (silicon hydride) and H$_2$ (hydrogen) was employed as a source gas. Next, an SiN (silicon nitride) layer was formed as a gate insulating layer 4 on the a-Si:H layer in the same chamber of the plasma CVD equipment as used for the formation of the a-Si:H layer. The SiN layer was made 300 [nm] thick under the conditions that the same substrate temperature of 250 [°C.] was held as in the formation of the active layer (a-Si:H layer), and that a gaseous mixture consisting of SiH$_4$, NH$_3$ (hydrogen nitride) and N$_2$ (nitrogen) was employed as a source gas.

Subsequently, an Al layer having a thickness of 250 [nm] was formed as a gate electrode 5 at a substrate temperature of 100 [°C.] by magnet ton sputtering. Thereafter, the Al layer, the active layer and the SiN layer were patterned by photolithography. On this occasion, the Al layer was first over-etched, so as to recede from the edges of a resist pattern, by the use of a mixed aqueous solution which consisted of phosphoric acid, acetic acid and nitric acid. Secondly, the active layer and the SiN layer were patterned by dry etching.

When the resulting structure was observed with an SEM (scanning electron microscope), the receding width of the gate electrode (Al layer) 5 on one side thereof was about 1.5 [μm] relative to the pattern width of the semiconductor layer (active layer) 3 as well as the gate insulating layer (SiN layer) 4. After a protective layer 6 was formed on the above structure by RF plasma CVD, a through-hole was provided on the pattern of each pixel electrode, and the ITO layer 2 was subsequently etched using the same mask pattern.

Figure 2:
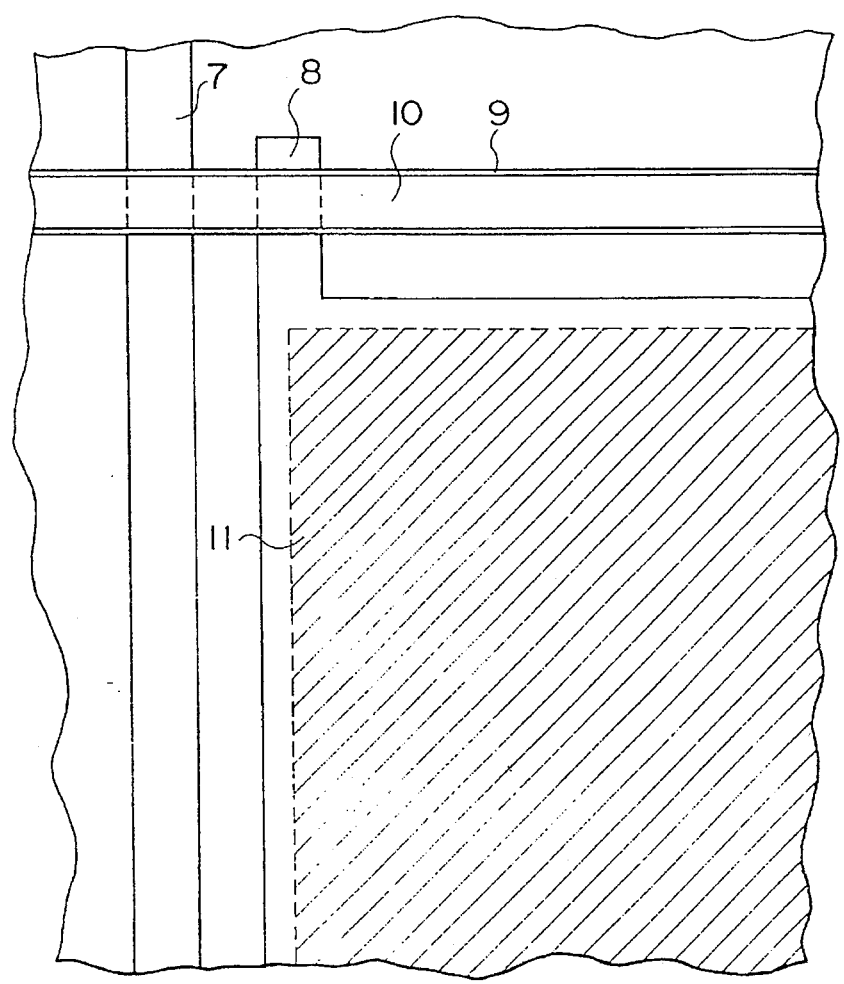
FIG. 2 is a schematic plane view showing part of the plane pattern of the TFT element in Example 1.

In this example, the thickness of the pixel electrode part was regulated to about 150 [nm]. It has been discovered that a transmittance of approximately 90 [%] can be ensured in this way. A schematic plane view showing part of the plane pattern of the manufactured element is depicted in FIG. 2. Referring to this figure, numeral 7 designates the drain wiring line, numeral 8 the source electrode, numeral 9 the stacked area of the SiN layer and the a-Si:H layer, and numeral 10 a gate wiring line. A hatched part 11 enclosed with a broken line corresponds to the pixel electrode, in other words, the through-hole in the protective layer.

Example 2

Figure 3:
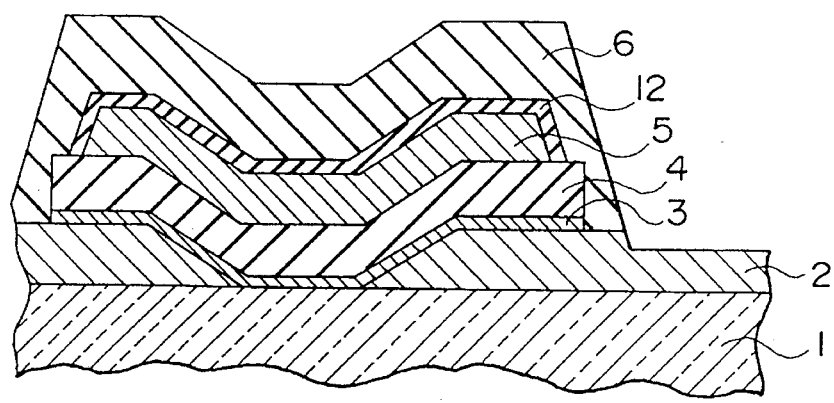
FIG. 3 is a schematic sectional view showing a TFT element which is included in an active matrix type liquid-crystal display device according to Example 2.

FIG. 3 is a schematic vertical sectional view showing a TFT element manufactured in this example. The point of difference of Example 2 from Example 1 is that the front surface and edges of the Al gate electrode 5 in FIG. 1 are formed with an Al$_2$O$_3$ (aluminum oxide) film as a surface oxide layer 12. The Al$_2$O$_3$ film was produced by anodic oxidation as described below.

The gate electrodes (5) of the TFT elements manufactured by the same method as in Example 1 were connected together and then taken out as a forming terminal, which was used as an anode. Further, an electrode made of Pt (platinum) was used as a counter electrode (a cathode). An aqueous solution of tartaric acid was diluted with ethylene glycol, whereupon the diluted with ethylene glycol was employed as an anodizing solution. Its pH-value was adjusted by adding ammonia. The anodic oxidation was performed by applying a predetermined anodizing voltage across the anode and the cathode, and the Al$_2$O$_3$ film formed was 150 [nm] thick.

Example 3

Figure 4:
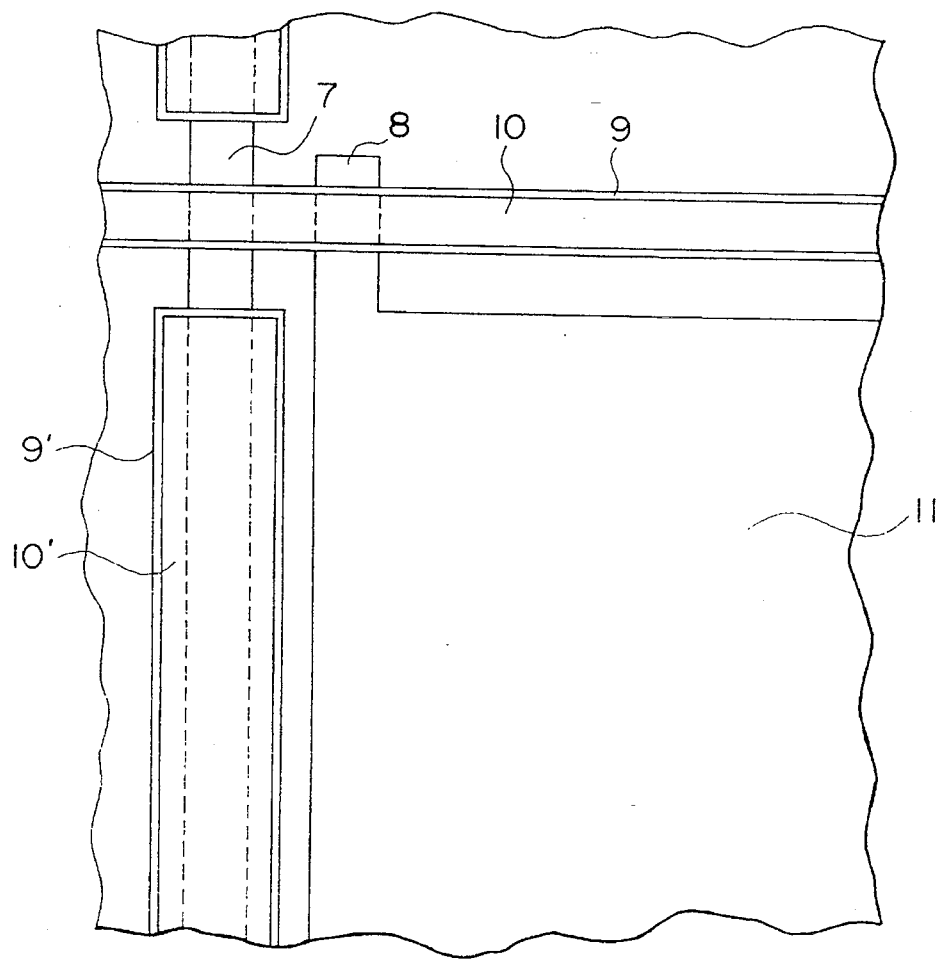
FIG. 4 is a schematic plane view showing part of the plane pattern of a TFT element which is included in an active matrix type liquid-crystal display device according to Example 3.

FIG. 4 is a schematic plane view showing part of the plane pattern of a TFT element manufactured in this example. The points of difference of Example 3 from Example 1 depicted in FIG. 2 are that the stacked area 9' between the SiN and a-Si:H layers and an Al layer (the same layer as the gate wiring) 10' are formed on parts of the drain wiring 7, and that the front surface and edges of the Al layer 10' are formed with an $Al_2O_3$ film produced by the anodic oxidation, so the parts of the ITO layer outside the parts 9' and 10' and the stacked SiN/a-Si:H area 9 as well as the gate wiring 10 are thin. In this case, the step of the ITO layer does not correspond to the through-hole of the protective layer, but it is substantially in agreement with the pattern of the stacked SiN/a-Si:H areas.

In this example, an organic resin layer was employed as the protective layer, and it was not provided with any through-hole. Thus, the intention of simplifying the manufacturing process of the TFT-LCD device can also be fulfilled.

The characteristics of a large number of panels manufactured in Examples 1 to 3 were estimated. It was then verified that all the articles exhibit charging rates which are applicable to the XGA (1024×768 dots) class of diagonal 12.5 [inches], and that they do not undergo the gate-drain leakages.

According to the present invention, an active matrix type liquid-crystal display device can be manufactured by a simple process, it can lower the resistance of drain wiring, and it can suppress the leakages between the gate electrodes and the drain electrodes of thin film transistors. It is consequently possible to curtail the cost of the TFT-LCD device and to improve the performance of the TFT-LCD device.

What is claimed is:

1. An active matrix type liquid-crystal display device comprising:

a plurality of gate wiring lines and drain wiring lines crossing perpendicularly to each other and laid on a first insulating substrate, the gate wiring lines and the drain wiring lines being electrically insulated from each other at crossover areas thereof;

thin-film transistors respectively arranged near the individual crossover areas with their respective source electrodes connected to corresponding transparent pixel electrodes disposed near the source electrodes, with their respective drain electrodes connected to the drain wiring lines, and with their respective gate electrodes connected to the gate wiring lines, the above structure including the first insulating substrate being covered with either only alignment layers or both protective insulating layers and alignment layers;

sets of transparent electrodes and alignment layers, each of the sets being opposite to a corresponding one of the transparent pixel electrodes, disposed on a second insulating substrate, the second insulating substrate being transparent and being located in opposition to the first insulating substrate; and a liquid crystal is held between the two insulating substrates, the gate wiring lines, the drain wiring lines, and the transparent electrodes opposing the wiring lines on the transparent insulating substrate, being connected to liquid-crystal driver circuits formed outside the liquid-crystal display device, said drain wiring lines, said drain electrodes and said source electrodes of said thin-film transistors, and said transparent pixel electrodes being formed of the same material that is ITO, and said transparent pixel electrodes being thinner than the drain wiring lines, wherein said drain wiring lines, said drain electrodes and said source electrodes of said thin-film transistors, and said transparent pixel electrodes are respectively formed with tapered edges, and a taper angle of each of the tapered edges is within 30°.

2. The active matrix type liquid-crystal display device as defined in claim 1, wherein transparent conductor layers which forms said drain wiring lines, and said gate wiring lines may respectively have a sheet resistance of, at most, 5 [Ω/□].

3. The active matrix type liquid-crystal display device as defined in claim 1, wherein said transparent pixel electrodes exhibit a transmittance of, at least, 85 [%] for a radiation which has a wavelength of 550 [nm].

4. The active matrix type liquid-crystal display device as defined in claim 1, wherein said gate electrodes are made of a metal material whose main component is an element selected from the group consisting of aluminum (Al) and tantalum (Ta), and a front surface and edges of each of said gate electrodes are covered with an anodic oxidation film of the electrode material.

5. An active matrix type liquid-crystal display device comprising:

a plurality of gate wiring lines and drain wiring lines crossing perpendicularly to each other and laid on a first insulating substrate, the gate wiring lines and the drain wiring lines being electrically insulated from each other at crossover areas thereof;

thin-film transistors respectively arranged near the individual crossover areas with their respective source electrodes connected to corresponding transparent pixel electrodes disposed near the source electrodes, with their respective drain electrodes connected to the drain wiring lines, and with their respective gate electrodes connected to the gate wiring lines, the above structure including the first insulating substrate being covered with either only alignment layers or both protective insulating layers and alignment layers;

sets of transparent electrodes and alignment layers, each of the sets being opposite to a corresponding one of the transparent pixel electrodes, disposed on a second insulating substrate, the second insulating substrate being transparent and being located in opposition to the first insulating substrate; and a liquid crystal is held between the two insulating substrates, the gate wiring lines, the drain wiring lines, and the transparent electrodes opposing the wiring lines on the transparent insulating substrate, being connected to liquid-crystal driver circuits formed outside the liquid-crystal display device, said drain wiring lines, and said drain electrodes and said source electrodes of said thin-film transistors being formed of the same material as that of said transparent pixel electrodes, and said transparent pixel electrodes being thinner than the drain wiring lines, wherein each of said thin-film transistors includes a semiconductor layer, a gate insulating layer and the gate electrode which are formed extending on the drain electrode and the source electrode, and a pattern of a stacked area of the semiconductor layer and the gate insulating layer and a pattern of said gate electrode lie on an identical center line in a state in which right and left pattern parts, with respect to the center line, are symmetrical.

6. The active matrix type liquid-crystal display device as defined in claim 5, wherein a width of the pattern of said gate electrode is smaller than that of the pattern of the stacked area of said semiconductor layer and said gate insulating layer, and a difference between both the widths is between 0.2 and 5 [μm].

7. The active matrix type liquid-crystal display device as defined in claim 5, wherein the protective insulating layers for covering said first insulting substrate are respectively formed on the corresponding transparent pixel electrodes with through-holes each of which has an area not larger than that of the transparent pixel electrode, and a plane pattern of the through-hole is substantially in agreement with that of steps which are respectively formed by the drain wiring line, the drain electrode and the source electrode of the thin-film transistor, and said transparent pixel electrode.

8. The active matrix type liquid-crystal display device as defined in claim 5, wherein steps are respectively formed by the drain wiring line, the drain electrode and the source electrode of the thin-film transistor, and the transparent pixel electrode, and a plane pattern of the steps is substantially in agreement with that of the stacked area of said semiconductor layer and said gate insulating layer of said thin-film transistor.

* * * * *